(12) United States Patent  
Cherubin

(10) Patent No.: US 8,568,041 B2  
(45) Date of Patent: Oct. 29, 2013

(54) SUPPORT FOR VIDEO-PHOTOGRAPHIC APPARATUS

(75) Inventor: Enrico Cherubin, Cassola (IT)

(73) Assignee: Lino Manfrotto & Co. S.p.A., Cassola (VI) (IT)

( * ) Notice: Subject to any disclaimer, the term of this patent is extended or adjusted under 35 U.S.C. 154(b) by 70 days.

(21) Appl. No.: 13/107,156

(22) Filed: May 13, 2011

(65) Prior Publication Data

US 2011/0280566 A1    Nov. 17, 2011

(30) Foreign Application Priority Data

May 13, 2010   (IT) .............................. PD2010A0150

(51) Int. Cl.
*G03B 17/00* (2006.01)
*H04N 5/225* (2006.01)

(52) U.S. Cl.
USPC ........................... 396/428; 396/421; 348/373

(58) Field of Classification Search
USPC ........................... 396/428, 419, 421; 348/373
See application file for complete search history.

(56) References Cited

U.S. PATENT DOCUMENTS

| 4,751,540 A | 6/1988 | Jones |
| 2007/0090235 A1 | 4/2007 | Ziemkowski et al. |
| 2008/0245945 A1 | 10/2008 | Law et al. |
| 2008/0247749 A1 | 10/2008 | Law et al. |
| 2010/0301184 A1* | 12/2010 | Stabler ........................ 248/346.5 |

FOREIGN PATENT DOCUMENTS

JP             9127602 A         5/1997

OTHER PUBLICATIONS

Search report in corresponding Italian application IT PD20100150.

* cited by examiner

*Primary Examiner* — Rochelle-Ann J Blackman
(74) *Attorney, Agent, or Firm* — Kristina Castellano; Castellano PLLC

(57) ABSTRACT

A support (1; 100) for videophotographic equipment (2; 200), comprises a plate (3; 3') fixable by suitable fixing means (5; 5') to an item of video-photographic equipment (2; 200) to be supported, support elements (7; 7') hinged on said plate (3; 3') by means of respective hinge means (8; 8') so as to be moved between a closed position (Y) in which said support elements (7; 7') are folded onto said plate (3; 3') and at least one open position (Z) in which said support elements (7; 7') are opened out from said plate (3; 3') to support the latter, said hinge means (8; 8') comprise a resilient element (20; 20') that is housed in a receiving seat (22; 22') defined in said plate (3; 3') and exerts on hinge portions (14, 15; 14', 15') of said support elements (7; 7') a thrust force which thrusts said hinge portions (14, 15; 14', 15') against walls (23; 23') of said seat (22; 22') to brake the rotation of said support elements (7; 7') in relation to said plate (3; 3'), the resilient element comprises at least one spring (20; 20') interposed between said hinge portions (14, 15; 14', 15').

9 Claims, 5 Drawing Sheets

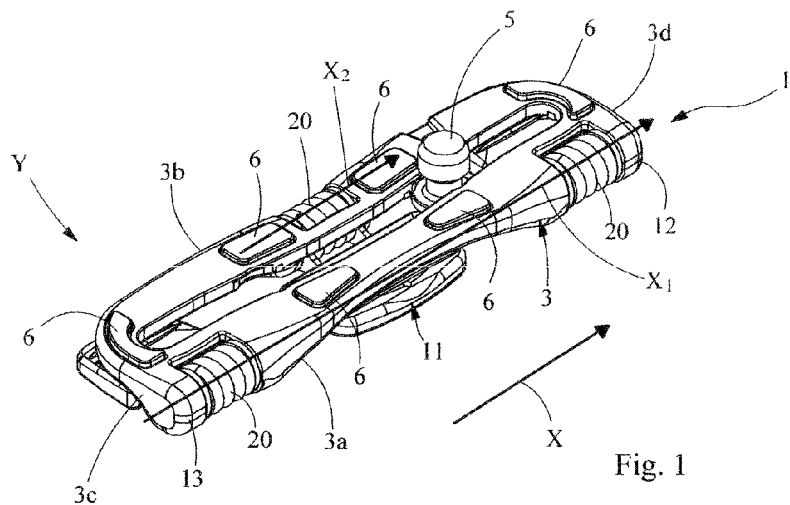
Fig. 1
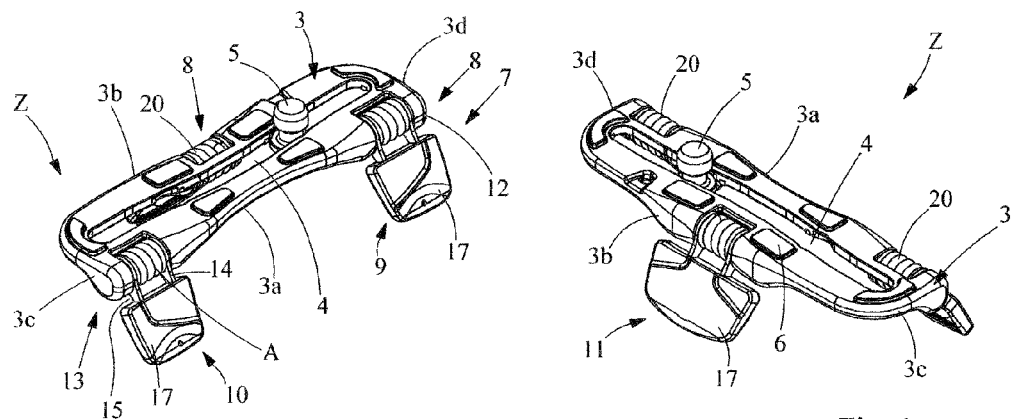
Fig. 3
Fig. 4
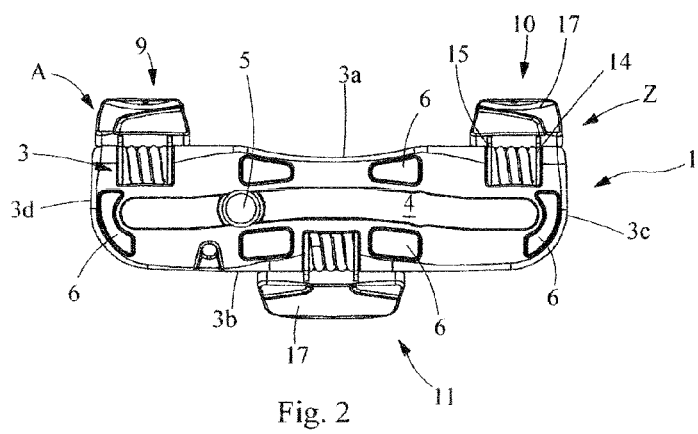
Fig. 2

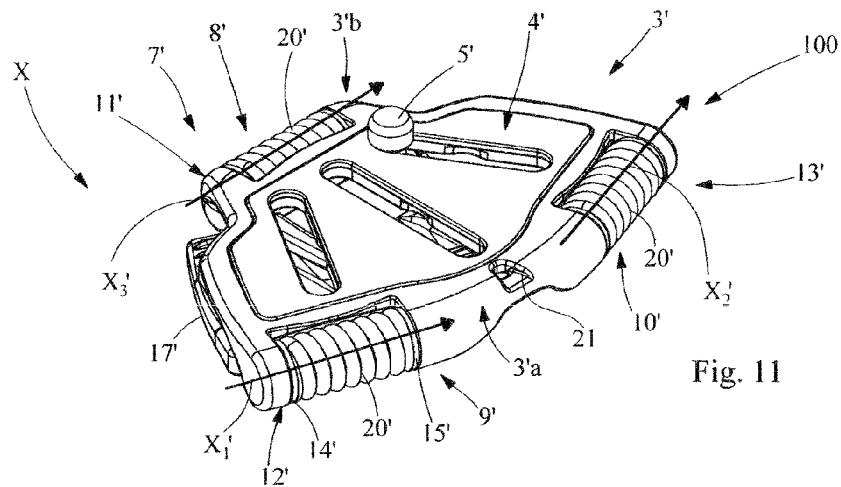
Fig. 11
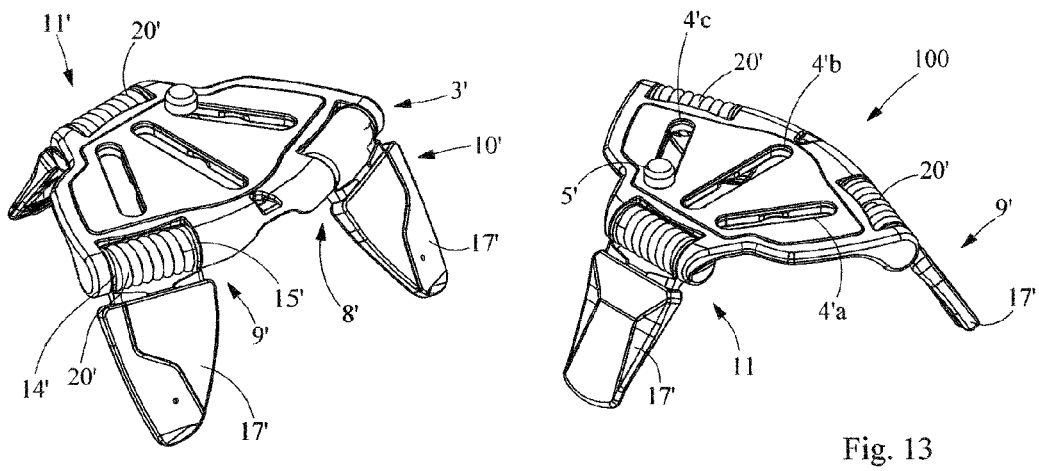
Fig. 12
Fig. 13
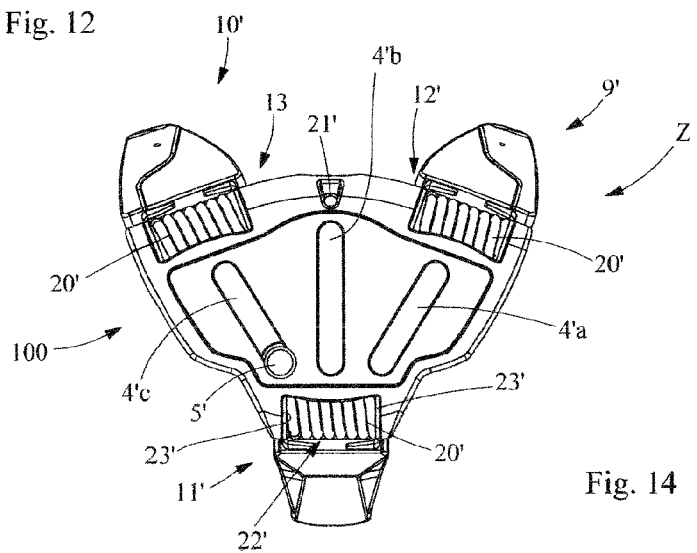
Fig. 14

SUPPORT FOR VIDEO-PHOTOGRAPHIC APPARATUS

CLAIM FOR PRIORITY

This application claims the benefit of priority to Italian patent application PD2010A000150 filed May 13, 2010, the entire contents of which are incorporated herein by reference.

FIELD

The subject of the invention is a support for videophotographic equipment.

TECHNOLOGICAL BACKGROUND

In the amateur field it sometimes occurs that, when having to take videophotographic shots, it is necessary to rest the equipment on a support, for example in order to take a self-timed shot, or shots with long exposure times, using a surface available on the spot on which to rest the equipment taking the shot.

However, in these cases, the correct framing of the subject to be taken may prove extremely difficult, and the quality of the shots may strongly reflect such a makeshift solution because of any unevenness of the selected surface which does not make it possible to support the equipment in a stable manner, and also because of the impossibility of adapting and/or adjusting the height or the general position of such surface.

Moreover, using the videophotographic equipment may prove extremely uncomfortable for the operator.

On the other hand, it would be very inconvenient to always carry a tripod on one's back in order to have it available in the case of necessity.

In these conditions both positioning the equipment and correctly framing the subject are complex.

To remedy such drawbacks, there are known from WO2006123382 supports for videophotographic equipment that are removably associable with an item of videophotographic equipment and are of extremely small dimensions so as to be easily transportable.

Such supports comprise a plate associable with the equipment, and two small wings pivotally fixed on opposite sides of the plate and movable between a position folded onto the plate and an extended position in which the wings are opened out with respect to each other to support the equipment associated with the support. Between the two wings there extends a tie-rod to limit the overall spreading apart thereof.

Each of the two wings of the support described in WO2006123382 is provided with two projections suitable for forming bearing portions for the support. The support is therefore provided with four bearing points, which sometimes causes problems of instability.

JP9127602 describes a compact support for videophotographic equipment having a base associable with the equipment, provided with three legs which are pivotal in relation to the base in order to be moved between a position folded onto the base and an extended position in which the legs rest on a desired surface to support the equipment. This support, while remedying the above-mentioned drawback of the support of WO2006123382, has other drawbacks however.

The adjustment of the inclination of the legs in a desired position, and therefore the centring of the framing which it is desired to obtain with the equipment, prove particularly laborious. Moreover, it is difficult to lock the legs in the desired position in order to avoid displacement thereof during the shots, and afterwards to unlock the legs in order to fold them back onto the base.

Such drawbacks are emphasized with uneven support surfaces and/or with very heavy equipment.

SUMMARY

The technical problem underlying the invention is that of providing a compact support for videophotographic equipment structurally and functionally designed to make it possible to remedy the drawbacks mentioned with reference to the prior art cited.

In particular, it is proposed to provide a compact support for videophotographic equipment, the position of which is adjustable simply and rapidly.

One aim is to provide a compact support, the position of which can be adjusted continuously and precisely so as to position the equipment at a desired inclination.

Another aim is to provide a support which maintains the selected position during use of the equipment.

These aims are achieved by a compact support produced in accordance with the present invention.

BRIEF DESCRIPTION OF THE DRAWINGS

The features and advantages of the invention will become clearer from the following detailed description of a preferred, but not exclusive, exemplary embodiment thereof, illustrated by way of non-limiting example with reference to the appended drawings, in which:

FIG. 1 is a perspective view of a support according to the invention in the closed position;

FIG. 2 is a top view of the support of FIG. 1 in the open position;

FIGS. 3 and 4 are perspective views of the support of FIG. 2, seen in two different directions;

FIGS. 11-18 are views corresponding respectively to FIGS. 1-8, but relating to an alternative embodiment of the support of the invention.

DETAILED DESCRIPTION

Figures 5, 6:
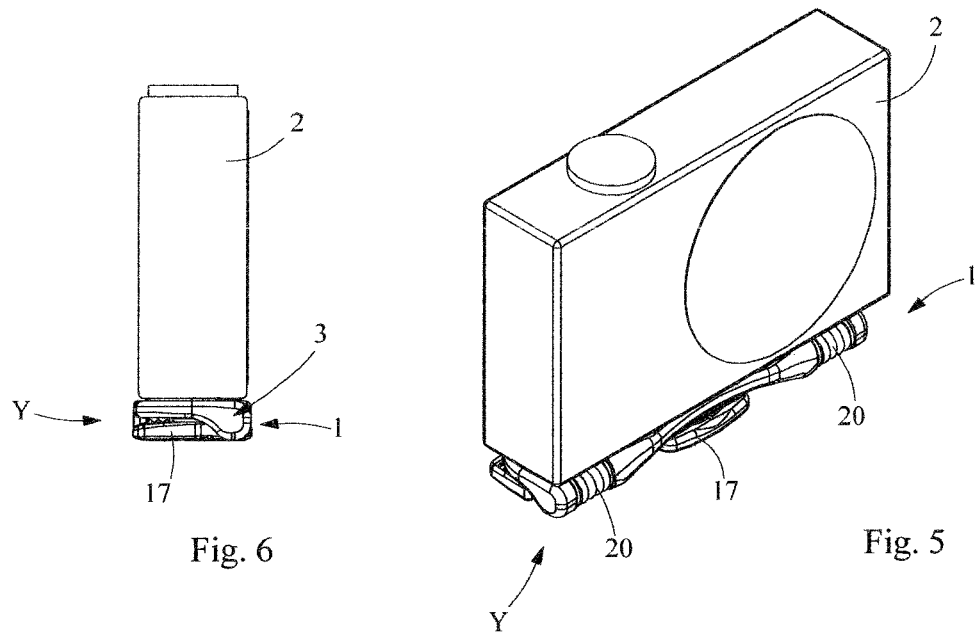
FIG. 5 is a perspective view of a photographic camera provided with the device of FIG. 1 in the closed position.
FIG. 6 is a side view of the assembly of FIG. 5.
Figures 7, 8:
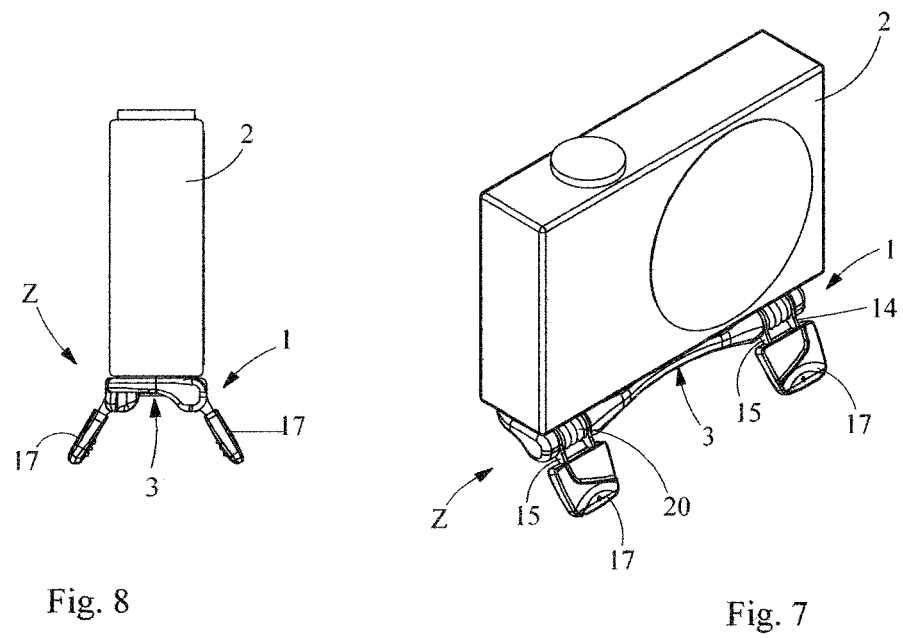
FIGS. 7 and 8 are views similar respectively to those of FIGS. 5 and 6, but with the support in the open position.

FIGS. 1-10 show a support 1 for an item of videophotographic equipment such as, for example, a photographic camera 2 of the compact type.

The support 1 comprises a plate 3 of a shape similar to that of a base portion of the compact type photographic camera 2.

The plate 3 has an elongate, approximately rectangular shape, in which are formed two long sides 3a, 3b and two short sides 3c, 3d, respectively facing each other.

The plate 3 is provided with connecting means for connecting the plate 3 to the photographic camera 2.

In the embodiment shown, the connecting means comprise a slot 4 within which can move fixing means 5 suitable for co-operating with complementary fixing means of the photographic camera 2, which are not shown, to allow the photographic camera 2 to be removably fixed to the support 1.

The slot 4 extends for a considerable portion of the length of the plate 3, which is understood as the larger dimension of the plate 3 itself. In the embodiment shown, the slot 4 is provided in a central position in the plate 3 and extends substantially along a longitudinal axis X of the plate 3 itself; in other embodiments, however, the slot 4 may also extend diagonally on the plate 3. The ability of the fixing means 5 to be moved and the extent of the slot 4 in the length of the plate 3 make it possible to position in a stable manner on the support 1 items of equipment even of different shapes from one another and with different weight distributions.

The plate 3, in the part which is intended, in use, to face towards the photographic camera 2, is additionally provided with a plurality of raised portions 6 suitable for receiving the photographic camera 2 so that it is supported. The raised portions 6 are made of soft material to avoid any damage to the photographic camera 2 and make it possible to improve the stability of the equipment on the support 1.

The support 1 additionally comprises support elements 7 hinged to the plate 3 via respective hinge means 8 in such a way as to be movable between a closed configuration Y, shown in FIGS. 1, 5 and 6, in which the support elements 7 are folded onto the plate 3, and at least one open configuration Z shown in FIGS. 2-4 and 7 and 8, in which the support elements 7 are opened out to support the plate 3 and the photographic camera 2 fixed thereto.

The hinge means 8 are configured in such a way as to allow continuous rotation of the support elements 7 in relation to the plate 3, that is, the support elements may be placed in any angular position in relation to the plate 3.

This means that there is a high degree of versatility of positioning of the support 1, which may be positioned with any desired inclination with respect to the horizontal.

The support elements 7 comprise three support legs pivotally fixed on opposite sides of the plate 3: two support legs 9, 10 hinged onto a first long side 3a of the plate 3, and a third support leg 11 hinged onto the second long side 3b of the plate 3.

The presence of three support legs 9-11 enables the positioning of the support 1 to be particularly stable in the open position Z, as explained more clearly hereinafter.

In particular, the presence of the three support legs 9-11 makes it possible to position the support 1 in a stable manner also on uneven support surfaces.

The three support legs 9-11 are rotatable independently of one another, and can be positioned at angles in relation to the plate 3 which are different from one another, thus significantly increasing the versatility of positioning of the support 1 and the stability thereof.

Preferably, the two support legs 9, 10 are positioned in proximity to opposite ends 12, 13 of the first long side 3a, while the third support leg 11 is positioned approximately centrally on the second long side 3b.

Figure 10:
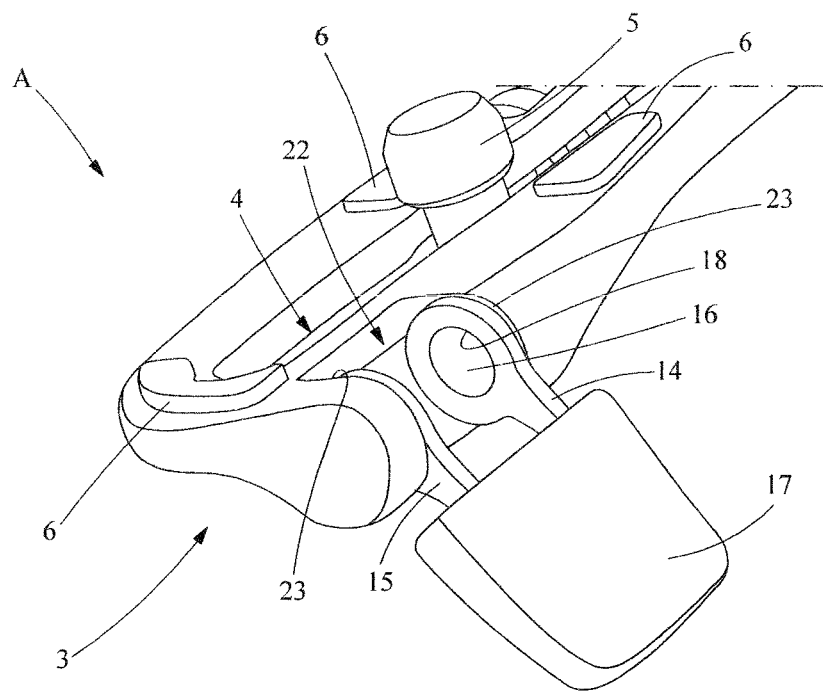
FIG. 10 is a view similar to that of FIG. 9 with a part removed for easier viewing.
Figure 9:
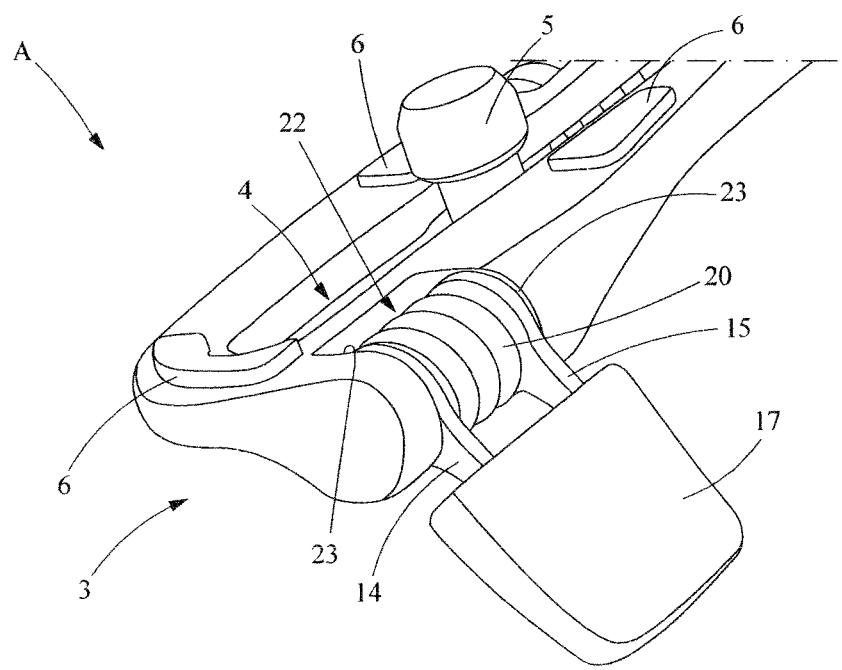
FIG. 9 is an enlarged view of the detail A of FIG. 2.

Each support leg 9-11 comprises a body 17 from which extend two appendages 14-15, more clearly visible in FIGS. 9 and 10, acting as hinge portions to hinge each leg 9-11 onto the plate 3. Each appendage 14-15 is provided with an eyelet 18 in which a corresponding protuberance 16 of the plate 3 is slidably received so as to be able to rotate each leg 9-11 in relation to the plate 3 about a respective axis of rotation. In the embodiment shown, the two legs 9, 10 are rotatable about the same axis of rotation X1, the leg 11 being rotatable about its own axis of rotation X2, disposed parallel to the axis X1, and the axes of rotation X1, X2 being approximately parallel to the longitudinal axis X of the plate 3.

In embodiments which are not shown, each leg is rotatable about its own axis of rotation, the axes of rotation of each leg being disposed transversely in relation to one another and with respect to the longitudinal axis X of the plate 3.

Between the two appendages 14, 15 of the same leg 9-11 there is defined on the plate 3 a receiving seat 22 suitable for receiving at least one spring 20, or similar resilient element for regulating and braking the rotation of each leg 9-11 in relation to the plate 3, as is explained more clearly hereinafter.

In the example of the Figures, one spring 20 is received in each receiving seat 22, nevertheless in other examples not shown a plurality of springs positioned one next to the other, preferably coaxially, may be provided in each seat 22.

The protuberances 16 provided in the plate 3, and protruding from the walls 23 of the seat 22 towards the inside thereof, act as centring and retaining elements for the spring 20 in the seat 22.

The spring 20 is inserted into the seat 22 in such a way as to press the appendages 14 and 15 towards opposite walls 23 of the seat 22, the appendages 14 and 15 then being interposed between the spring 20 and the walls 23 of the seat 22.

Each spring 20 is formed by winding a wire of diameter "d" to form a desired number of turns "s" with a winding diameter "D". The spring 20 is shaped in such a way that the end turns "s" bear against the appendages 14 and 15, avoiding direct thrust contact with parts of the plate 3. The outer contour of each spring 20 is substantially aligned with the long sides 3a, 3b of the plate 3, in such a way that the spring 20 is substantially contained within the overall dimensions of the plate 3.

The force "F" exerted by the spring 20 at its ends, that is, on the appendages 14, 15 of each leg 9-11, depends on the number of turns "s", the diameter "d" of the wire, the winding diameter "D", and the material of which the spring 20 is made. The thrust force exerted by the spring 20 tends to press the appendages 14 and 15 against the corresponding walls 23 of the seat 22. The appendages 14 and 15 are able to be spread apart resiliently by the effect of the spring 20, so as to transmit the thrust force of the spring 20 as a frictional force acting on the walls 23 of the seat 22 and, therefore, on the plate 3. By suitably sizing the spring 20 and selecting the material thereof, it is possible to calibrate the force exerted by the spring 20 to urge the appendages 14, 15 against the walls 23 and, therefore, the resistant couple generated on the plate 3 which opposes rotation of the support legs 9-11 in relation to the plate 3.

A photographic camera 2, or other item of equipment, resting on the plate 3, with the support 1 in the open position Z, generates on the legs 9-11 a couple which tends to rotate the legs 9-11 so as to open out in relation to the plate 3.

However, when the resistant couple generated by the springs 20 is greater than the couple generated by the weight of the photographic camera 2, no displacement of the support 1 takes place.

Preferably, each spring 20 is of such dimensions that the resistant couple is greater than the couple generated by the videophotographic apparatus to be supported with the support 1 in order to obtain a stable support.

The couple generated by the equipment depends on its weight, which is customarily between 100 and 800 g.

Preferably, each spring 20 is of such dimensions as to exert on the appendages 14, 15 a force F of at least 50 N, preferably between around 50 and 150 N. Therefore each spring 20 is of such dimensions as to be able, on its own, to support the support 1, preventing any displacement thereof when the latter has been suitably positioned, with an item of equipment having a weight of between 100 and 800 g fixed to the plate 3.

After having positioned the legs 9-11 in any desired position of the photographic camera 2, the legs maintain the aforesaid position and it is necessary to apply to the legs 9-11 a force greater than the frictional force acting on the plate 3, in order to move them from that position.

Therefore it is not necessary to provide dedicated locking means for locking the legs 9-11 in any desired open configuration Z.

This significantly simplifies the construction and use of the support 1 according to the invention compared with known supports.

Moreover, the positioning of the legs 9-11 in any open configuration Z for supporting the photographic camera 2 is particularly stable.

This makes it possible to obtain in a simple manner a stable support which enables a specific position to be maintained and which is not subject to displacement during the use of the photographic camera 2. A high quality of the shots that can be taken with the photographic camera 2 is obtained, even when resting on makeshift surfaces.

With the support of the invention it is additionally possible to adjust continuously the position of the legs 9-11 in relation to the plate 3, that is, to place them in any rotated position in relation to the plate 3.

Moreover, with the support of the invention it is possible to position each of the legs 9-11 independently of one another.

The prolonged use of the support 1 causes a wear of the appendages 14 and 15 and of the opposite walls 23 of the seat 22 due to the reciprocal sliding in rotating the legs 9-11.

Nevertheless, in the support of the invention, consequently to the wear, the spring 20 will expand in the seat 22 so that the end turns "s" will press the appendages 14 and 15 towards opposite walls 23 of the seat 22.

Thus also in case of wear, the spring 20 will brake and regulate the rotation of each leg 9-11.

This allows also the position of the appendages 14 and 15 in the seat 22 to be kept stable since the appendages 14 and 15 won't slide in the seat 22. Consequently, also in case of wear, the position of the legs 9-11 is kept stable.

This allows the apparatus of the invention to be efficiently used also for prolonged periods of time.

This makes it possible to position the support 1 in a particularly simple manner, to position the photographic camera 2 with any inclination whatever with respect to the horizontal axis, and therefore to increase in a simple manner the framing obtainable with the photographic camera 2 fixed to the support 1.

This additionally renders the support 1 particularly flexible and suitable for use on inclined or uneven support surfaces, when in order to maintain horizontal framing it is necessary to incline the support legs 9-11 differently from one another.

The support 1 is made of a light metallic material so as to limit its overall weight; however, the springs 20 and the appendages 14 and 15 are made of steel, a material which is not very subject to wear. In this way the appendages 14 and 15 are not damaged by the force exerted by the spring 20 during the movement of the legs 9-11, the interposition of the appendages 14 and 15 between the spring 20 and the plate 3 enabling the latter to be protected during the movement of the legs 9-11.

On the other hand, the plate 3 of the support 1 is preferably made of Zamak, an alloy of Zn and Al, which enables the overall weight of the support to be limited and which is at the same time an easily moulded material.

Moreover, the use of Zamak makes it possible to limit deformation of the plate 3 by the effect of the thrust action exerted by the springs 20.

The thrust force exerted by the springs 20 at the ends, that is, the frictional force acting on the walls 23 of the seat 22, tends to deform the plate 3, pushing its ends 12, 13 upwards, that is, towards the photographic camera 2, when this is fixed onto the support 1.

In other words, the plate 3 tends to assume a slight U-shaped configuration owing to the effect of the springs 20. The use of Zamak enables such deformation to be limited compared with aluminium.

However, a certain, although limited, deformation of the plate so that it assumes a U-shaped configuration is not only acceptable but desirable because it makes it possible to improve the stability of the fixing of the photographic camera 2 onto the support 1 and therefore, overall, of the entire assembly, improving the quality of the shots.

In one embodiment the support 1 is provided with a screwdriver or some other screwing device for screwing the photographic camera to the fixing means 5. The plate 3 of the support 1 is provided with a hole 21 for inserting the screwdriver by means of a small cable when it is not being used.

FIGS. 11-18 show an alternative embodiment, indicated by 100, of a support according to the invention, in which parts corresponding to the support 1 of FIGS. 1-10 are indicated by the same reference numerals and are not described in detail. The support 100 is particularly suitable for being used for videophotographic equipment of considerable size, such as, for example, a reflex type photographic camera 200 provided with a telescopic lens 201 associable with the body 202 of the photographic camera 200.

Figure 15:
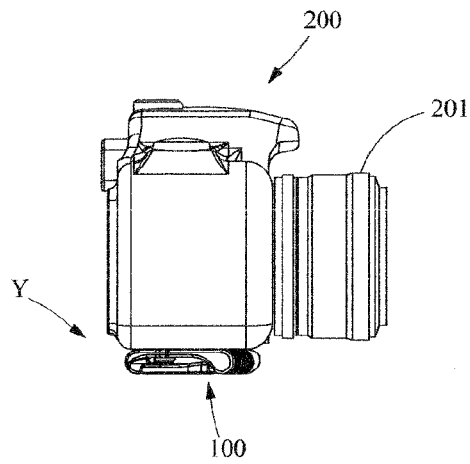
Figure 16:
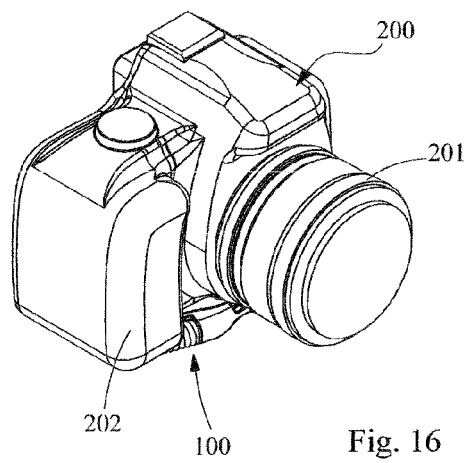
Figure 17:
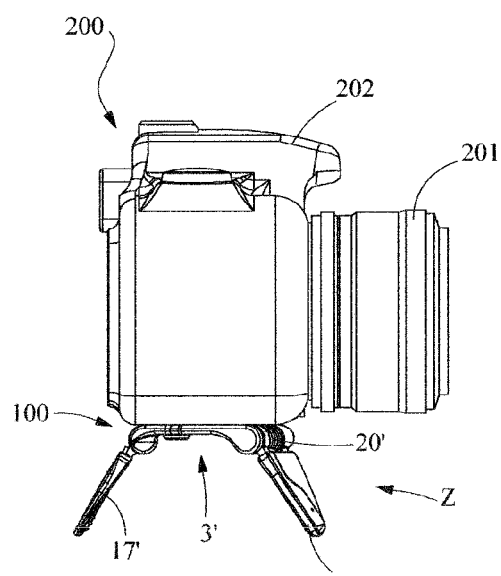
Figure 18:
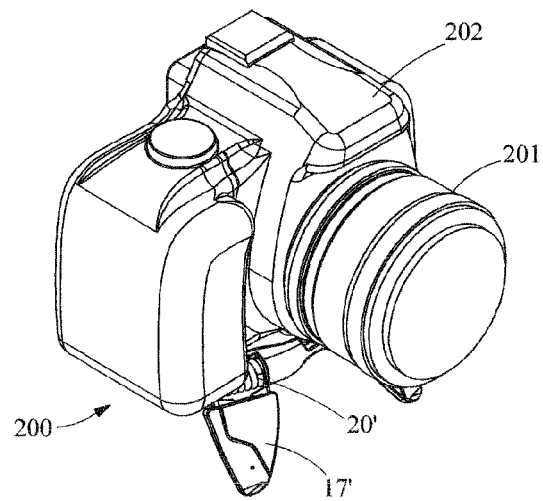

The support 100 comprises a plate 3' to which are hinged, via respective hinge means 8', support elements 7' movable between a closed configuration Y, shown in FIGS. 11, 15 and 16, in which the support elements 7' are folded onto the plate 3', and at least one open configuration Z shown in FIGS. 12-14 and 17 and 18, in which the support elements 7' are opened out to support the plate 3' and the photographic camera 200 fixed thereto.

The plate 3' is substantially trapezoidal in shape, with a major base 3'a, to the opposed end portions 12', 13' of which are hinged two support legs 9' and 10', and a minor base 3'b to which is hinged, in a central position, a third support leg 11'. The legs 9'-11' are rotatable about respective axes of rotation X1'-X3'.

The end portions 12', 13' of the major base 3'a of the plate 3' are inclined inwards, that is, towards the minor base 3'b, in such a way as to increase the bearing stability of the support 100.

The legs 9'-11' are hinged to the plate 3' by means of respective springs 20' which exert at their ends and, therefore, on the appendages 14', 15' of each leg 9'-11', a force F' of between 245 and 450 N.

In this way, each spring 20' exerts a resistant couple such as to prevent displacement of the legs 9'-11' in relation to a specific position, even with photographic cameras weighing up to around 1.5 kg. Therefore, with photographic cameras weighing up to 1.5 kg the couple exerted by the photographic camera 200 (or other equipment) on the legs 9'-11' is not sufficient to displace them and the support 100 maintains its own position.

In order to displace the legs 9'-11' of the support 100 from any position it is necessary to exert a force greater than the frictional force exerted on the plate 3' by the springs 20', thus rendering the support 100 stable even with equipment of considerable dimensions, and therefore considerable weight.

It is not therefore necessary to provide locking means for the support legs 9'-11', thus significantly simplifying the construction and use of the support 100 of the invention compared with known supports.

The support 100 is provided with connecting means comprising, in the embodiment shown, a plurality of slots 4' extending in the plate 3' and with each of which are removably associable fixing means 5' for fixing the photographic camera 200 to the support 100. The plurality of slots 4' comprises three slots 4'a, 4'b, 4'c, each of which extends in the direction defined between the minor base 3'b and the major base 3'a.

The three slots 4'a, 4'b, 4'c are disposed in a fan shape on the plate 3', that is, the distance between two adjacent slots 4'a-4'b and 4'b-4'c increases progressively from the minor base 3'b towards the major base 3'a.

The ability of the fixing means 5' to be moved in the slots 4'a-4'c, the extension of the slots 4'a-4'c in the trapezoidal plate 3', and the provision of three separate slots 4'a-4'c suitably spaced on the plate 3', makes it possible to position in a stable manner on the support 100 items of equipment 200 even of different shapes from one another and with different weight distributions.

By suitably moving the fixing means 5' in each slot 4a-4c it is possible to render stable on the support 100 the positioning of photographic cameras 200 having lenses 201 of various lengths; in addition, by associating the fixing means 5 with the different slots 4a-4c of the support 100 it is possible to render stable on the support 100 the positioning of photographic cameras 200 having weight distributions different from one another. In each case the stability of the assembly consisting of the support 100 and photographic camera 200 is increased considerably.

In this embodiment also, the advantages described with reference to the embodiment of FIGS. 1-10 are maintained: the presence of three support legs 9'-11' allows the positioning of the support 100 to be particularly stable in any open configuration Z, even on uneven bearing surfaces; the position of the support legs 9'-11' in relation to the plate 3' can be continuously adjusted, that is, the legs 9'-11' can be positioned in any rotated position in relation to the plate 3', and the legs 9'-11' can be positioned independently of one another, thus making it possible, if desired, to incline the support 100 and/or to position it horizontally even if resting on inclined surfaces.

In this embodiment also, the springs 20' are shaped in such a way as to be received in the seats 22' and substantially so as not to protrude in relation to the overall dimensions of the plate 3'. The appendages 14' and 15' of each leg 9'-11' are interposed between the springs 20' and the walls 23' of the respective seats 22' and are made of steel so as to resist the wear resulting from the rotation of the legs 9'-11' during use of the support 100. On the other hand, the plate 3' is made of Zamak in order to limit its overall weight.

The plate 3' is provided with a seat for fixing a small cable, accessible via an inlet portion 21', for a screwdriver or some other screwing device for screwing the photographic camera to the fixing means 5'.

In embodiments which are not shown, a support of the invention may be provided with connecting means for removably receiving fixing means for fixing the equipment to the support which are different from the slots described above.

Although the invention has been described in example embodiments, those skilled in the art will appreciate that various modifications may be made without departing from the spirit and scope of the invention. It is therefore to be understood that the inventions herein may be practiced other than as specifically described. Thus, the present embodiments should be considered in all respects as illustrative and not restrictive. Accordingly, it is intended that such changes and modifications fall within the scope of the present invention as defined by the claims appended hereto.

I claim:

1. Support for videophotographic equipment, comprising a plate fixable by suitable fixing means to an item of videophotographic equipment to be supported, support elements hinged on said plate by means of respective hinge means so as to be moved between a closed position (Y) in which said support elements are folded onto said plate and at least one open position (Z) in which said support elements are opened out from said plate to support the latter, said hinge means comprise a resilient element that is housed in a receiving seat defined in said plate and exerts on two appendages of each one of said support elements a thrust force which thrusts said appendages against walls of said seat to brake the rotation of said support elements in relation to said plate, said appendages acting as hinge portions for said support elements, wherein said resilient element comprises at least one spring interposed between said appendages.

2. The support according to claim 1, wherein said at least one spring is configured so as to allow continuous rotation of said support elements in relation to said plate for positioning said support elements in any angular position in relation to said plate.

3. The support according to claim 1, wherein said at least one spring is of such dimensions as to exert on said appendages a thrust force of between 50 and 150N.

4. The support according to claim 1, wherein said at least one spring is of such dimensions as to exert on said appendages a thrust force of between 245 and 450N.

5. The support according to claim 1, wherein said support elements comprise three support legs, two support legs hinged onto a first side of said plate and a third support leg hinged onto a second side of said plate opposite to said first side.

6. The support according to claim 1, further comprising connecting means for removably receiving said fixing means for fixing said equipment to said support.

7. The support according to claim 6, wherein said connecting means comprise a slot extending substantially along a longitudinal axis (X) of said plate, said fixing means being movable along said slot.

8. The support according to claim 6, wherein said connecting means comprise a plurality of slots suitably spaced on said plate, said fixing means being associable with each slot of said plurality of slots.

9. The support according to claim 1, wherein said plate comprises Zamak, said appendages and said resilient element comprises steel.

* * * * *